US009065137B2

(12) United States Patent
Amatucci et al.

(10) Patent No.: US 9,065,137 B2
(45) Date of Patent: Jun. 23, 2015

(54) COPPER FLUORIDE BASED NANOCOMPOSITES AS ELECTRODE MATERIALS

(75) Inventors: Glenn G. Amatucci, Peapack, NJ (US); Fadwa Badway, Piscataway, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 1935 days.

(21) Appl. No.: 11/177,729

(22) Filed: Jul. 8, 2005

(65) Prior Publication Data

US 2006/0019163 A1    Jan. 26, 2006

Related U.S. Application Data

(63) Continuation-in-part of application No. 10/721,924, filed on Nov. 25, 2003, now Pat. No. 7,371,338, which is a continuation-in-part of application No. 10/261,863, filed on Oct. 1, 2002, now Pat. No. 7,625,671.

(60) Provisional application No. 60/429,492, filed on Nov. 27, 2002, provisional application No. 60/680,253, filed on May 11, 2005.

(51) Int. Cl.
| H01M 4/00 | (2006.01) |
| H01M 4/583 | (2010.01) |
| H01M 4/58 | (2010.01) |
| H01M 4/62 | (2006.01) |

(52) U.S. Cl.
CPC ............ H01M 4/5835 (2013.01); H01M 4/626 (2013.01); H01M 4/58 (2013.01); H01M 4/624 (2013.01)

(58) Field of Classification Search
CPC ....... H01M 4/624; H01M 4/626; H01M 4/36; H01M 4/48; H01M 4/5805; H01M 4/58; H01M 4/5825; H01M 4/382; H01M 4/9016; H01M 4/96; H01M 2004/028; H01M 12/08
USPC ................. 429/232, 483, 482, 530, 532, 220
See application file for complete search history.

(56) References Cited

U.S. PATENT DOCUMENTS

| 5,670,277 | A | * | 9/1997 | Barker et al. | 429/220 |
| 5,744,258 | A | * | 4/1998 | Bai et al. | 429/3 |
| 2002/0098411 | A1 | * | 7/2002 | Gan et al. | 429/128 |
| 2003/0013019 | A1 | * | 1/2003 | Barker et al. | 429/231.9 |
| 2003/0148188 | A1 | * | 8/2003 | Umemoto | 429/310 |
| 2005/0136328 | A1 | * | 6/2005 | Eylem et al. | 429/220 |
| 2006/0035147 | A1 | * | 2/2006 | Lam et al. | 429/218.1 |
| 2008/0003496 | A1 | * | 1/2008 | Neudecker et al. | 429/122 |

OTHER PUBLICATIONS

STIC search.*
STIC Search: 11/177729 performed by Lisa Henderson.*
Badway et al., Carbon-Metal Fluoride Nanocomposites, Journal of the Electrochemical Society, 150(9), A1209-A1218, 2003.

* cited by examiner

*Primary Examiner* — Milton I Cano
*Assistant Examiner* — Stephen Yanchuk
(74) *Attorney, Agent, or Firm* — Greenberg Traurig, LLP

(57) ABSTRACT

The present invention relates to primary and secondary electrochemical energy storage systems, particularly to such systems as battery cells, which use materials that take up and release ions as a means of storing and supplying electrical energy.

14 Claims, 7 Drawing Sheets

COPPER FLUORIDE BASED NANOCOMPOSITES AS ELECTRODE MATERIALS

CROSS REFERENCE TO RELATED APPLICATIONS

This application, which claims the benefit of priority of U.S. Provisional Application No. 60/680,253, filed on May 11, 2005, is a continuation in part of application Ser. No. 10/721,924 filed on Nov. 25, 2003, now U.S. Pat. No. 7,371,338, which claims the benefit of priority of U.S. Provisional Application No. 60/429,492 filed on Nov. 27, 2002. U.S. patent application Ser. No. 10/721,924 is a continuation in part of U.S. application Ser. No. 10/261,863 filed on Oct. 1, 2002, now U.S. Pat. No. 7,625,671. The entire disclosures of U.S. patent application Ser. No. 10/721,924, U.S. patent application Ser. No. 10/261,863 and U.S. Provisional Patent Applications No. 60/429,492 and 60/680,253 are herein incorporated by reference.

FIELD OF THE INVENTION

The present invention relates to primary and secondary electrochemical energy storage systems, particularly to such systems as battery cells, which use materials that take up and release ions as a means of storing and supplying electrical energy.

BACKGROUND OF THE INVENTION

The lithium-ion battery cell is the premiere high-energy rechargeable energy storage technology of the present day. Unfortunately, its high performance still falls short of energy density goals in applications ranging from telecommunications to biomedical. Although a number of factors within the cell contribute to this performance parameter, the most crucial ones relate to how much energy can be stored in the electrode materials of the cell.

During the course of development of rechargeable electrochemical cells, such as lithium (Li) and lithium-ion battery cells and the like, numerous materials capable of reversibly accommodating lithium ions have been investigated. Among these, occlusion and intercalation materials, such a carbonaceous compounds, layered transition metal oxide and three dimensional pathway spinels have proved to be particularly well-suited to such applications. However, even while performing reasonably well in recycling electrical storage systems of significant capacity, many of these materials exhibit detrimental properties, such as marginal environmental compatibility and safety, which detract from the ultimate acceptability of the rechargeable cells. In addition, some of the more promising materials are available only at costs that limit widespread use. However, of most importance is the fact that the present state of the art materials have the capability to store relatively low capacity of charge per weight of material (specific capacity, mAh/g) or energy per weight (specific energy, Wh/kg).

Materials of choice in the fabrication of rechargeable battery cells, particularly highly desirable and broadly implemented Li-ion cells, have for some considerable time centered upon graphitic negative electrode compositions, which provide respectable capacity levels in the range of 300 mAh/g. Complementary positive electrode materials in present cells use less effective layered intercalation compounds, such as $LiCoO_2$, which generally provides capacities in the range of 150 mAh/g. Alternative intercalation materials, such as $LiNiO_2$, and $LiMn_2O_4$, have more recently gained favor in the industry, since, although exhibiting no appreciable increase in specific capacity, these compounds are available at lower cost and provide a greater margin of environmental acceptability.

Due to increasing demand for ever more compact electrical energy storage and delivery systems for all manner of advancing technologies, the search continues for battery cell materials capable of, on the one hand, providing greater specific capacity over wider ranges of cycling rates, voltages, and operating temperatures, while, on the other hand, presenting fewer environmental hazards and greater availability at lower processing and fabrication costs. Searches for more effective positive electrode materials, in particular, have become far-reaching with attention turning more frequently to the abundant lower toxicity transition metal compounds, which are typically accessible at economical costs.

In the intense search of material systems which can deliver much higher specific capacities and energy, interest has shifted to examination of the more active fluoride compounds. Recently, Badway et al. (*Journal of The Electrochemical Society*, 150(9) A1209-A1218 (2003)) reported the use of carbon metal fluoride nanocomposites to enable the electrochemical activity of metal fluorides. Their studies have shown that reducing the particle size of metal fluoride to the nanodimensions in combination with highly conductive carbon resulted in the enablement of a new metal fluoride conversion process positive electrodes resulting in a major improvement in specific capacity relative to current state of the art. Badway et al. reported>90% recovery of the $FeF_3$ theoretical capacity (>600 mAh/g mAh/g) in the 4.5-1.5 V region through reversible conversion, which is a fundamentally different energy storage mechanism compared with the present state of the art intercalation.

Despite this success, the full utilization of certain metal fluorides, such as copper fluoride, has not been realized. Researchers have tried to enable this high energy density compound for more than 30 years with only limited success because of poor utilization of the material. Copper fluoride has a theoretical conversion potential of approximately 3.2 V, and a discharge specific capacity of approximately 520 mAh/g, leading to an exceptionally high energy density in excess of 1500 Wh/kg. Such capacity values are over 300% higher than those attained in present day state-of-the-art rechargeable Li battery cells based on $LiCoO_2$ intercalation compounds. With respect to existing primary cathode compounds, copper fluoride would exceed the widely utilized $MnO_2$ energy density by almost a factor of two.

Hence, there is a need in the art for electrical energy-storage and delivery systems that utilize copper fluoride effectively.

SUMMARY OF THE INVENTION

The present invention relates to the formation and utilization of nanostructures of copper fluoride which include metal oxide composites, or nanocomposites; novel copper fluoride structures; and novel conducting matrices. The nanostructures serve as active electrode component materials for use in electrochemical cells, such as lithium battery cells, capable of exhibiting high specific capacity at high recharge and/or discharge rates.

An embodiment of the present invention provides a composition including a copper fluoride compound nanocomposite as an electrode material for an electrochemical energy storage cell.

Another embodiment of the present invention provides a composition having crystallites with sizes in the range of about 1 nm to about 100 nm, in which the crystallites include a copper fluoride compound incorporated in a nanocomposite. The aforementioned nanocomposite may be of nanoparticle (1-100 nm), macroparticle sizes (>100 nm), or in the form of a densified thin (<25000 nm) or thick (>25000 nm) films.

A further embodiment of the invention provides a composition including greater than 50 weight % of $CuF_2$ and having X-ray diffraction peaks of (200) and (022) with a 2θ separation less than 0.8 degree, wherein the composition demonstrates a specific capacity of about 100 mAh/g to about 600 mAh/g at a voltage of about 2 volts to about 4 volts when compared to a $Li/Li^+$ reference potential.

Another embodiment of the invention provides a compound including copper fluoride, wherein the compound includes an x-ray diffraction lattice parameter, a=3.25 Å±0.2 Å; b=4.585 Å±0.2 Å; c=4.585 Å±0.2 Å, B=84°±5°.

A further embodiment of the invention provides a nanocomposite compound including copper fluoride, wherein the compound includes an x-ray diffraction lattice parameter, a=3.25 Å±0.2 Å; b=4.585 Å±0.2 Å; c=4.585 Å±0.2 Å, B=84°±5°.

Another embodiment of the present invention provides a copper fluoride compound nanocomposite having greater than 50 weight % of $CuF_2$ that exhibits X-ray diffraction peaks (200) and (022) with a 2θ separation of less than 0.8 degree, prepared by a method including the steps of: (a) combining copper fluoride and a conductive matrix; and (b) fabricating the copper fluoride and the conductive matrix into a nanocomposite.

A further embodiment of the present invention provides a conductive matrix including $MoO_xF_z$, wherein x is 0≤x≤3 and z is 0≤z≤5 combined in such a way that the effective charge on the Mo cation is not more than 6+.

Another embodiment of the invention provides a $MoO_xF_z$ conductive matrix wherein x is 0≤x≤3 and z is 0≤z≤5 combined in such a way that an effective charge on the Mo cation is not more than 6+, prepared by the method including the steps of: (a) combining copper fluoride and a conductive matrix; (b) fabricating said copper fluoride and said conductive matrix into a nanocomposite.

A further embodiment of the invention provides an electrochemical cell including (a) a negative electrode; (b) a positive electrode comprising a copper fluoride compound nanocomposite; and (c) a separator disposed between the negative and positive electrodes.

Still another embodiment provides a method of preparing a copper fluoride compound nanocomposite having greater than 50 weight % of $CuF_2$ and having X-ray diffraction peaks of (200) and (022) with a two-theta separation of less than 0.8 degree, the method including the steps of: combining copper fluoride and a conductive matrix; and fabricating the copper fluoride and the conductive matrix into a nanocomposite.

A further embodiment provides a composition including a copper fluoride compound nanocomposite demonstrating a specific capacity of about 100 mAh/g to about 600 mAh/g at a voltage of about 2 volts to about 4 volts when compared to a Li/Li+ reference potential.

A further embodiment of the invention provides an electrochemical cell including: (a) a negative electrode; (b) a positive electrode having a copper fluoride compound nanocomposite; and (c) a separator disposed between the negative and positive electrodes, wherein the electrochemical cell demonstrates a specific capacity of about 100 mAh/g to about 600 mAh/g at a voltage of about 2 V to about 5 V.

DETAILED DESCRIPTION OF THE INVENTION

The present invention provides improved materials for battery components, specifically for positive electrodes in primary and rechargeable battery cells.

In one embodiment, the present invention provides a composition including a copper fluoride compound nanocomposite demonstrating a specific capacity of about 100 mAh/g to about 600 mAh/g at a voltage of about 2 V to about 4 V when compared to a Li/Li+ reference potential. In a preferred embodiment, the demonstrated specific capacity is from about 300 mAh/g to about 500 mAh/g. In a more preferred embodiment, the demonstrated specific capacity is from about 400 mAh/g to about 500 mAh/g. As used herein, "specific capacity" refers to the amount of energy the copper fluoride compound nanocomposite contains in milliamp hours (mAh) per unit weight.

In one embodiment, the specific capacity of the copper fluoride compound nanocomposite is reversible. "Reversible specific capacity" means that the nanocomposite of the present invention may be recharged by passing a current through it in a direction opposite to that of discharge.

The phrase "copper fluoride compound nanocomposites" as used herein means nanocrystallites comprising at least a "copper fluoride compound" incorporated within a nanocomposite, which may or may not be of nanoparticle size. As used herein, the phrase "copper fluoride compound" includes any compound that comprises the elements of copper (Cu) and fluorine (F). Examples of copper fluoride compounds include, but are not limited to, $CuF_2$.

Preferably, the copper fluoride compound nanocomposite further includes a second metal. One of skill in the art can readily identify metals for use in copper fluoride compound nanocomposites of the present invention. Such metals include, but are not limited to, non-transition metals and transition metals, preferably transition metals, and more preferably first row transition metals. Specific examples of metals for use in copper fluoride compound nanocomposites of the present invention include, but are not limited to, Fe, Co, Ni, Mn, V, Mo, Pb, Sb, Bi, Sn, Nb, Ag, Cr and Zn.

In a preferred embodiment, when a second metal is included in the copper fluoride nanocomposite of the invention, the compound is of the formula $Cu_xMe_yF$, where Me is the second metal where x>y.

In another embodiment, the copper fluoride compound further includes oxygen. One of skill in the art will recognize that oxygen can substitute for fluorine in metal fluorides. Oxygen may act to significantly improve the electrical conductivity of the nanocomposite of the invention.

In yet another embodiment, both oxygen and a second metal are included in the copper fluoride compound nanocomposite of the present invention. In a preferred embodiment, the compound is of the formula $Cu_xMe_yF_zO_w$, wherein x+z>y+w and w>0.

Carbon may, optionally, be included in the copper fluoride compound nanocomposite of the present invention. Preferably, less than 50 weight % of carbon is used. More preferably, less than 25 weight % carbon is used. Even more preferably less than 5 weight % carbon is used. Yet, still more preferably, the copper fluoride compound nanocomposite is of the formula $Cu_xMe_yF_zO_wC$, wherein x+z>y+w and w>0.

The copper fluoride compound nanocomposites of the present invention may, yet, further include a conductive matrix. As used herein, a "conductive matrix" refers to a matrix that includes conductive materials, some of which may be ionic and/or electronic conductors. Preferably the matrix will retain both ionic and electronic conductivity; such materials are commonly referred to as "mixed conductors".

Suitable conductive matrices include, but are not limited to, $VO_2$, $MoO_2$, $NiO$, $MoO_3$, molybdenum sulfides, molybdenum oxysulfides, titanium sulfide, $MoO_xF_z$, wherein x is $0 \leq x \leq 3$ and z is $0 \leq z \leq 5$ combined in such a way that the effective charge on the Mo cation is not more than 6+, $V_2O_5$, $V_6O_{13}$, $CuO$, $MnO_2$, chromium oxides, and carbon fluorides, for example, $CF_{0.8}$.

The copper fluoride compound nanocomposite of the present invention includes, preferably, from about 1 to about 50 weight % of a conductive matrix. In another, preferred, embodiment, the copper fluoride compound nanocomposite of the present invention includes from about 1 to about 25 weight % of a conductive matrix. Even more preferably, the copper fluoride compound nanocomposite of the present invention includes from about 2 to about 15 weight % of a conductive matrix.

Preferably, the conductive matrix is $MoO_xF_z$ where x is $0 \leq x \leq 3$ and z is $0 \leq z \leq 5$ combined in such a way that the effective charge on the Mo cation is not more than 6+. Even more preferably, the conductive matrix is $MoO_3$ or $MoF_3$.

In another embodiment, the copper fluoride compound nanocomposite of the present invention includes from about 1 to about 50 weight % of $MoO_xF_z$. Preferably, the nanocomposite includes from about 2 to about 25 weight % of $MoO_xF_z$. Even more preferably, the nanocomposite of the present invention includes from about 2 to about 15 weight % of $MoO_xF_z$.

The copper fluoride compound nanocomposites of the present invention preferably have a crystallite size of about 1 nm to about 100 nm in diameter; more preferably, of about 1 nm to about 50 nm in diameter; even more preferably of about 2 nm to about 30 nm in diameter; and still more preferably, of about 2 nm to about 15 nm in diameter.

The inventive nanocomposites may be prepared by extreme, high impact-energy milling of a mixture that includes a copper fluoride compound and, optionally, a metal and/or carbon and/or oxygen and/or 5 to 50 weight % of a conductive matrix. Thus, the copper fluoride compound nanocomposite of the present invention can be prepared by using an impact mixer/mill such as the commercially available SPEX 8000 device (SPEX Industries, Edison N.J., USA). Unlike the shearing action of conventional planetary, roller, or ball mills, which at best may allow for size reduction of crystallite particles to the micrometer range, the extremely high-energy impact action impressed upon the component mixture by the impact mill provides, within milling periods as short as about 10 minutes, a particle size reduction of the processed material to the nanostructure range of less than about 100 nm. Further milling for as little as 30 minutes up to about 4 hours brings about crystallite-particle size reduction to less than about 40 nm.

Other methods may be used to form the nanocomposites of the present invention. As will be evident to a skilled artisan, solution or gel techniques may be used to fabricate the nanocomposites. Generally, as used herein, solution, gel, or high-energy impact milling techniques are referred to as "nanocomposite fabrication methods."

When copper fluoride is milled with another component, the copper fluoride undergoes chemical changes such that its X ray diffraction characteristics takes on the character of a new, highly electrochemically active material, although retaining major aspects of the copper fluoride. In addition, the nanocrystallite formation can be characterized easily by well known methods such as Bragg peak broadening in x-ray diffraction and microscopy by methods such as transmission electron microscopy.

In another aspect of the present invention, an electrochemical cell, preferably a primary or rechargeable battery cell, is provided which employs the inventive copper fluoride compound nanocomposites as the cathode material. The cell may be prepared by any known method. The inventive nanocomposite electrode (cathode) materials function well with most other known primary or secondary cell composition components, including polymeric matrices and adjunct compounds, as well as with commonly used separator and electrolyte solvents and solutes.

For example, electrolyte compositions commonly used in known rechargeable electrochemical-cell fabrication serve equally well in the cells of the present invention. These electrolyte compositions may include one or more metallic salts, such as, but not limited to, lithium, magnesium, calcium, zinc, manganese, and yttrium. Lithium salts, such as $LiPF_6$, $LiBF_4$, $LiClO_4$, and the like, dissolved in common cyclic and acyclic organic solvents, such as ethylene carbonate, dimethyl carbonate, propylene carbonate, ethyl methyl carbonate, and mixtures thereof, may be used. As with optimization of the nanocomposites of the present invention, specific combinations of electrolyte components will be a matter of preference of the cell fabricator and may depend on an intended use of the cell, although consideration may be given to the use of solutes such as $LiBF_4$, which appear less susceptible during cell cycling to hydrolytically forming HF, which could affect the optimum performance of some metal fluorides. For such reason, for instance, a $LiBF_4$:propylene carbonate electrolyte may be preferred over one comprising a long-utilized standard solution of $LiPF_6$ in a mixture of ethylene carbonate:dimethyl carbonate. In addition, such nanocomposites may be incorporated into solid state polymer cells utilizing solid state ionically conducting matrices derived from compounds such as polyethylene oxide (PEO). Nanocomposites also may be fabricated by thin film deposition techniques and be incorporated into solid state thin film lithium batteries utilizing a glassy electrolyte. Finally, such electrode materials may be incorporated into cells utilizing ionic liquid solvents as the electrolytes.

Likewise, the negative electrode members of electrochemical cells may advantageously include any of the widely used known ion sources such as lithium metal and lithium alloys, such as those comprised of lithium tin, lithium silicon, lithium aluminum, lithiated carbons such as those based on coke, hard carbon, graphite, nanotubes or $C_{60}$, and lithiated metal nitrides. The negative electrode members of electrochemical cells also may further include either a magnesium-, calcium-, zinc-, manganese-, or yttrium-based negative electrode.

In another aspect of the present invention, the copper fluoride compound nanocomposite of the present invention is characterized by three (Bragg) X-ray diffraction peaks, with 2θ values between 52 and 59 degrees. In contrast, the X-ray diffraction (XRD) characteristics of milled $CuF_2$ exhibits four XRD peaks (1,2,−1), (2,1,−1), (002), and (220). The nanocomposite of the present invention will also be referred to herein as the "three-peaks" copper fluoride compound nanocomposite formed by the systematic coalescence of the (200) and (022) XRD peak.

In another embodiment the copper fluoride compound is characterized by an x-ray diffraction lattice parameter wherein a=3.25 Å±0.2 Å; b=4.585 Å±0.2 Å; c=4.585 Å, ±0.2 Å, B=84°±5°.

In another embodiment, the nanocomposite of the present invention includes a copper fluoride compound and the copper fluoride compound is characterized by an x-ray diffraction lattice parameter wherein a=3.25 Å±0.2 Å; b=4.585 Å±0.2 Å; c=4.585 Å, ±0.2 Å, B=84°±5°.

In another embodiment of the present invention, the three-peaks copper fluoride compound nanocomposite has a composition that includes greater than 50 weight % of copper fluoride. The (200) and (022) XRD peaks have a 2θ separation of less than 0.8 degree.

A three-peaks copper fluoride compound nanocomposite includes any compound that has among its constituents the elements of copper (Cu) and fluorine (F). Examples of copper fluoride compounds include, but are not limited to, $CuF_2$. According to an aspect of the embodiment, the three-peaks copper fluoride compound nanocomposite exhibits a specific capacity of about 100 mAh/g to about 600 mAh/g at a voltage of about 2 V to about 5 V. In a preferred embodiment, the specific capacity is from about 400 mAh/g to about 500 mAh/g.

In another embodiment, the specific capacity of the three-peaks copper fluoride compound nanocomposite is reversible. This means that it is rechargeable upon a charge in the direction of a current passed through the nanocomposite Preferably, the three-peaks copper fluoride compound nanocomposite further includes a second metal. Such metals include, but are not limited to, non-transition metals and transition metals, preferably transition metals, and more preferably first row transition metals. Specific examples of metals for use with the three-peaks copper fluoride compound nanocomposite of the present invention include, but are not limited to, Fe, Co, Ni, Mn, V, Mo, Pb, Sb, Bi, Cr, Nb, Ag and Zn.

In another embodiment, carbon is included in the three-peaks nanocomposite of the present invention. Preferably, the nanocomposite includes less than 50 weight % of carbon.

In another embodiment, oxygen is included in the three-peaks nanocomposite of the present invention.

In another embodiment, the three-peaks copper fluoride compound nanocomposite of the present invention may include a conductive matrix.

Suitable conductive matrices include, but are not limited to, NiO, $MoO_3$, molybdenum sulfides, molybdenum oxysulfides, titanium sulfide, $MoO_xF_z$, wherein x is 0≤x≤3 and z is 0≤z≤5 combined in such a way that the effective charge on the Mo cation is not more than 6+, $V_2O_5$, $V_6O_{13}$, CuO, $MnO_2$, chromium oxides and carbon fluorides, for example, $CF_{0.8}$, $VO_2$, $MoO_2$. The three-peaks copper fluoride compound nanocomposite of the present invention includes, preferably, from about 5 to about 50 weight % of a conductive matrix. In another, preferred, embodiment, the inventive three-peaks copper fluoride compound nanocomposite includes from about 5 to about 25 weight % of a conductive matrix. Even more preferably, the three-peaks copper fluoride compound nanocomposite of the present invention includes from about 7 to about 15 weight % of a conductive matrix.

Preferably, the conductive matrix is $MoO_xF_z$ wherein x is 0≤x≤3 and z is 0≤z≤5 combined in such a way that the effective charge on the Mo cation is not more than 6+. Even more preferably, the conductive matrix is $MoO_3$. The three-peaks copper fluoride compound nanocomposite of the present invention includes, from about 1 to about 50 weight % $MoO_xF_z$. Preferably, the nanocomposite includes from about 2 to about 25 weight % of $MoO_xF_z$. Even more preferably, the three-peaks copper fluoride compound nanocomposite of the present invention includes from about 2 to about 15 weight % of $MoO_xF_z$.

The three-peaks copper fluoride compound nanocomposite preferably includes copper fluoride, with crystallite sizes of about 1 nm to about 100 nm in diameter, more preferably of about 1 nm to about 50 nm in diameter, even more preferably of about 2 nm to about 30 nm in diameter, and still more preferably of about 2 nm to about 15 nm in diameter.

In another aspect of the present invention, an electrochemical cell, preferably a primary or rechargeable battery cell, is provided which employs a three-peaks copper fluoride compound nanocomposite as the cathode material. The cell may be prepared by any known method. The three-peaks copper fluoride compound nanocomposite electrode (cathode) materials function well with most other known primary or secondary cell composition components, including polymeric matrices and adjunct compounds, as well as with commonly used separator and electrolyte solvents and solutes.

In another aspect of the present invention, a copper fluoride compound nanocomposite having greater than 50 weight % $CuF_2$ and having (200) and (022) XRD peaks with a 2θ separation of 0.8 degree is prepared by a method including the steps of (a) combining copper fluoride and a conductive matrix; and (b) fabricating the copper fluoride and the conductive matrix into a nanocomposite by any suitable known method for forming nanocomposites. Preferably, the method is the high-energy impact milling method described above. A suitable conductive matrix may be one selected from $VO_2$, $MoO_2$, $MoO_3$, $V_2O_2$, $CuO$, $CF_{0.8}$ and $MoO_xF_z$. Preferably, the conductive matrix is $MoO_xF_z$, wherein x is $0 \leq x \leq 3$ and z is $0 \leq z \leq 5$ combined in such a way that the effective charge on the Mo cation is not more than 6+ or $MoO_3$.

Metal fluorides may be combined with the inventive conductive matrix. Suitable metals useful in metal fluorides include, but are not limited to, non-transition metals and transition metals, preferably transition metals, more preferably, first row transition metals. Specific examples of metals for use with the metal fluorides of the conductive matrix of the present invention include, but are not limited to, Fe, Co, Ni, Mn, Cu, V, Mo, Sn, Pb, Sb, Bi, Ag and Si. Preferably, Cu is used.

In one embodiment, a $MoO_xF_z$ conductive matrix used to fabricate a nanocomposite includes at least one metal fluoride. Preferably, the nanocomposite includes from about 5 to about 50 weight % $MoO_xF_z$, more preferably from about 5 to about 25 weight % $MoO_xF_z$ and even more preferably from about 7 to about 15 weight % $MoO_xF_z$.

Carbon may, optionally, be included in the $MoO_xF_z$ conductive matrix of the present invention. Preferably, less than 50 weight % carbon is used. More preferably, less than 15 weight % of carbon is used.

The $MoO_xF_z$ conductive matrix of the present invention preferably, has a particle size of about 1 nm to about 100 nm. More preferably, the crystallite size is about 1 nm to about 50 nm, and even more preferably the crystallite size is about 2 nm to about 30 nm. Still more preferably, the particle size is about 2 nm to about 15 nm.

The inventive conductive matrix may be prepared by extreme, high-impact energy milling, as described above.

In another aspect of the present invention, an electrochemical cell, preferably a primary or rechargeable battery cell, is provided, which employs the inventive conductive matrix as a cathode material, optionally employing one or more of the metal fluorides described above. The cell may be prepared by any suitable method known in the art. The conductive matrix electrode (cathode) material functions well with most other known primary or secondary cell composition components, including polymeric matrices and adjunct compounds, as well as with commonly used separator and electrolyte solvents and solutes.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Electrode Preparation

Electrodes were prepared by adding poly-vinylidene fluoride-co-hexafluoropropylene (Kynar 280, Elf Atochem), carbon black (Super P, MMM), and dibutyl phthalate (Aldrich) to the inventive nanocomposites in acetone. The slurry was tape cast, dried for 1 hour at 22° C., and rinsed in 99.8% anhydrous ether (Aldrich) to extract the dibutyl phthalate plasticizer. The electrodes, 1 $cm^2$ disks or coin cells typically containing 57+/−1% inventive nanocomposites and 12+/−1% carbon black, were tested electrochemically versus Li metal (Johnson Matthey). The Swagelok™ or coin cells were assembled in a Helium-filled dry box using Whatman GF/D glass fiber separators saturated with 1 M $LiPF_6$ in ethylene carbonate:dimethyl carbonate (EC:DMC 1:1 in vol.) electrolyte (Merck). The cells were controlled by Mac-Pile (Biologic) or Maccor battery cycling systems. Cells were cycled under a constant current of 22 mA/g at 24° C.

Example 2

Preparation of $CuF_2$ Nanocomposite with $MoO_3$ Matrix and $CuF_2$ Non-Nanocomposite Reference Material A sample of 93% weight $CuF_2$, 15% weight carbon and 7% weight $MoO_3$ were milled in a high-energy impact mill under a helium atmosphere for 20 min. and subsequently annealed at 200° C. before the sample was extracted for structural and electrochemical characterization. The inventive nanocomposite was composed of crystallites of approximately 30 nm. As a basis for comparison, $CuF_2$ was thoroughly mixed under low-energy shear grinding condition using a mortar and pestle to yield a reference electrode material composed of particles with a size of about 1000 nm.

Example 3

Specific Capacities of $CuF_2$ Inventive Nanocomposite and the $CuF_2$ Non-Nanocomposite Reference Material Both the inventive nanocomposite and the reference electrode material were compared to assess their electrochemical efficacy as electrode materials. A series of cells was fabricated in the above-described manner and tested at room temperature (22° C.) over a period of time at constant amperage cycles of 22 mA/g between 4.5 and 2.0 V. The substantially insignificant specific capacity of about 100 mAh/g for the reference electrode material mixture may be seen in FIG. 1 which specific capacities for a non-nanocomposite $CuF_2$ and a copper fluoride nanocomposite. As seen in the figure, results of similar testing for the inventive nanocomposite show that the specific capacity of the milled copper fluoride increased by 400% compared with the reference electrode.

Example 4

Figure 2:
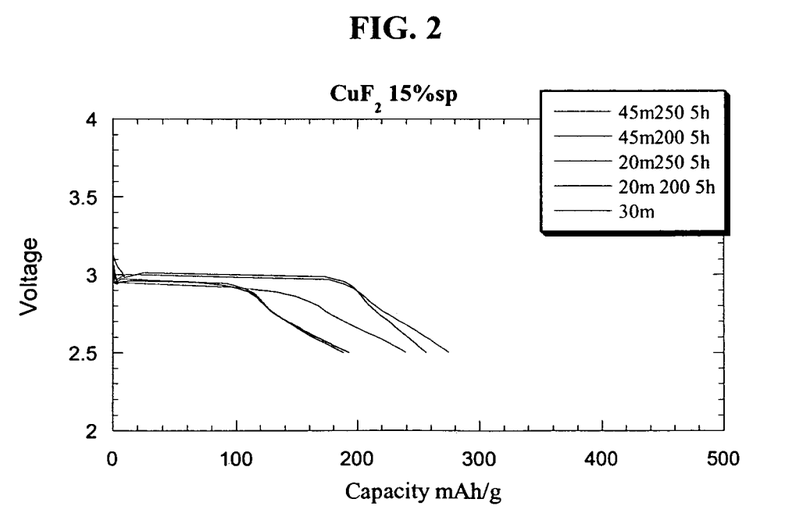
FIG. 2 is a graph depicting the specific capacity of a copper fluoride nanocomposite with a carbon conductive matrix, at various processing conditions.
Figure 3:
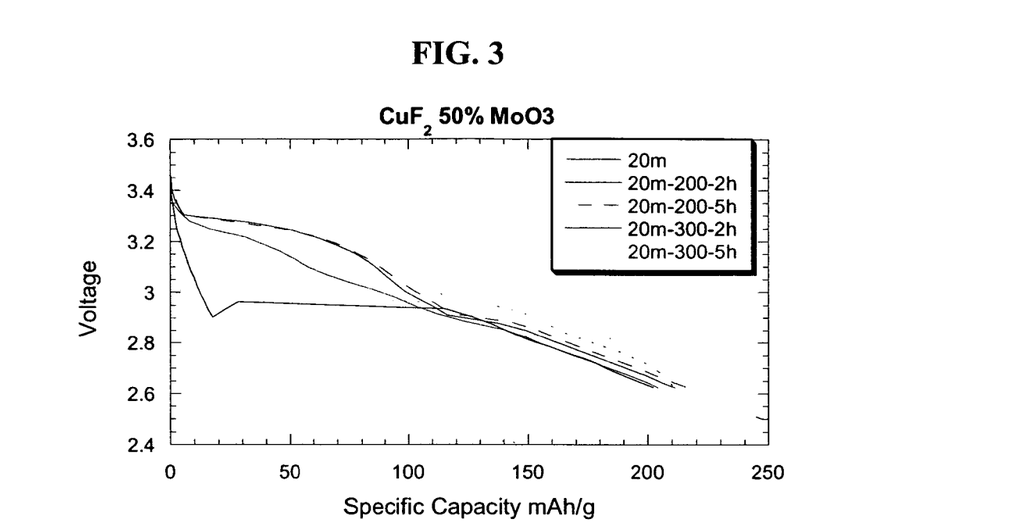
FIG. 3 is a graph depicting the specific capacity of a non-nanocomposite $CuF_2$ with a 50 weight % $MoO_3$ conductive matrix.
Figure 4:
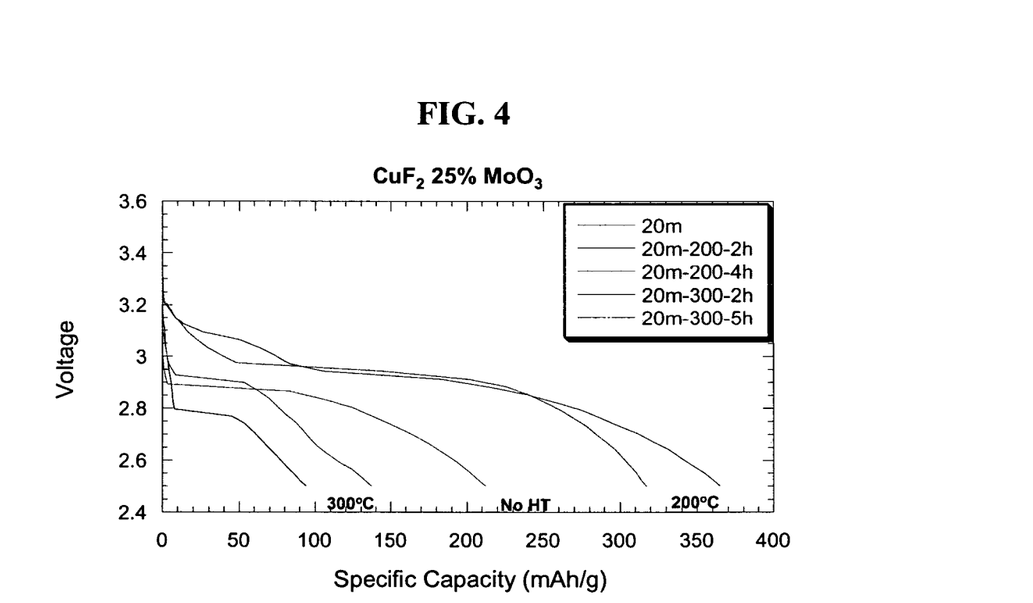
FIG. 4 is a graph depicting voltage as a function of specific capacity for a copper fluoride nanocomposite with a 25 weight % $MoO_3$ conductive matrix.

Specific Capacity of a $CuF_2$ Inventive Nanocomposite with a Carbon-Only Matrix 85 weight % $CuF_2$ and 15 weight % carbon were high-energy milled as described above for varying time periods, anneal temperatures, and anneal times to form a copper fluoride nanocomposite. Electrochemical cells were fabricated as described above and the specific capacity of the copper fluoride nanocomposite was observed. As can be seen in FIG. 2, the specific capacity was significantly increased by the milling process. However, the observed specific capacities are lower than the theoretical composite specific capacity of 480 mAh/g.

Example 5

Figure 1:
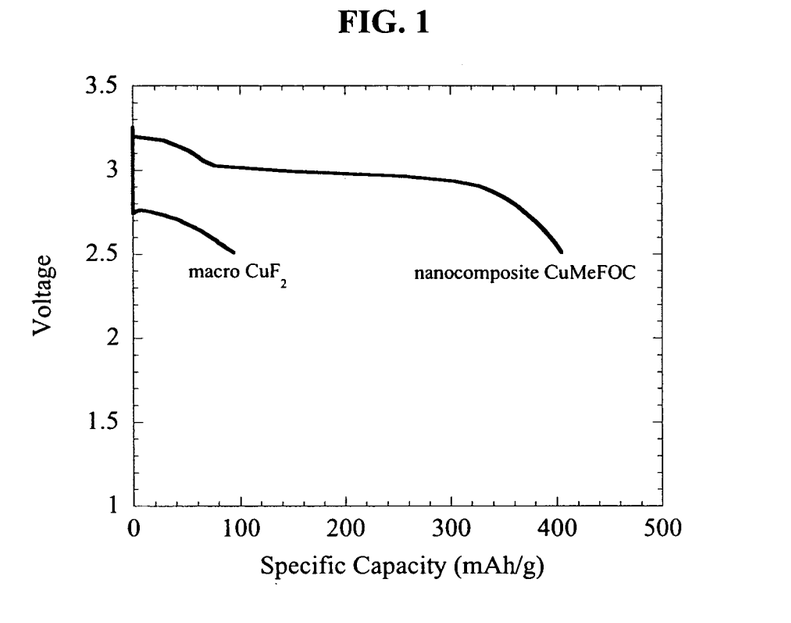
FIG. 1 is a graph depicting voltage as a function of specific capacity for a non-nanocomposite $CuF_2$ and a copper fluoride nanocomposite.
Figure 5:
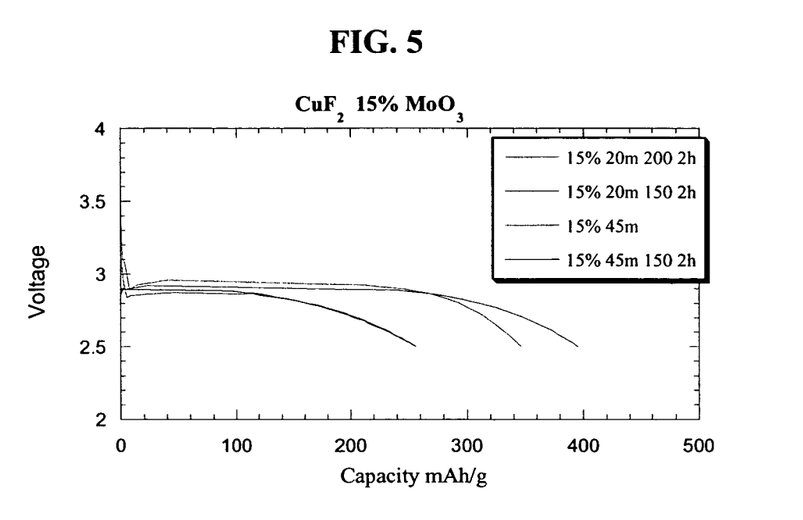
FIG. 5 is a graph depicting voltage as a function of specific capacity for a copper fluoride nanocomposite with a 15 weight % $MoO_3$ conductive matrix.
Figure 6:
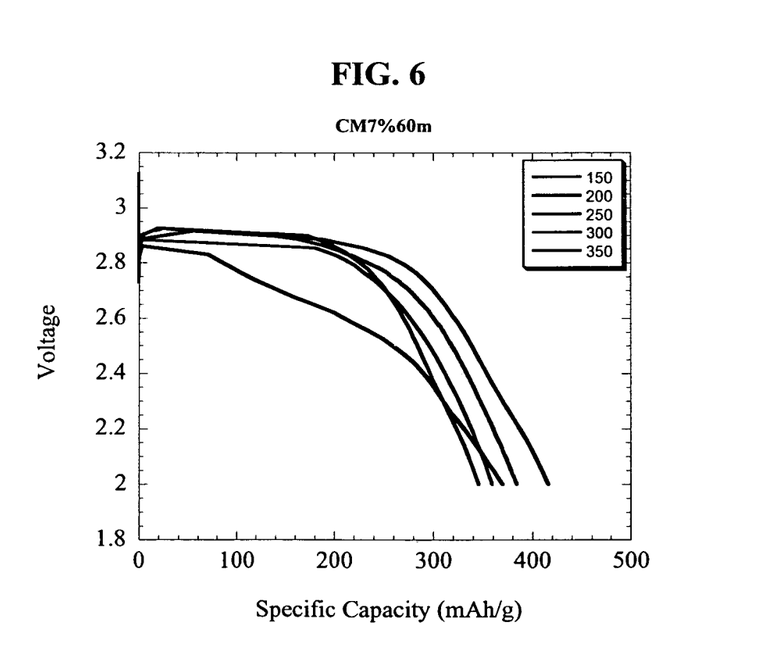
FIG. 6 is a graph depicting voltage as a function of specific capacity for a copper fluoride nanocomposite with a 7 weight % $MoO_3$ conductive matrix.

Effect of Varying Amounts of MoO₃ Conductive Matrix on the Specific Capacity of a CuF₂ Inventive Nanocomposite $MoO_3$ was used as a conductive matrix at varying concentrations to assess the effect of this compound for use with the copper fluoride compound nanocomposite of the present invention. 50 weight % $CuF_2$ and 50 weight % $MoO_3$; 75 weight % $CuF_2$ and 25 weight % $MoO_3$; 85 weight % $CuF_2$; 15 weight % $MoO_3$, 93 weight % $CuF_2$, and 7 weight % $MoO_3$ were high-energy milled as described above for various times and post annealed at various temperatures as summarized in FIG. 3 through FIG. 6 and tested for specific capacity. An electrode with 50 weight % $CuF_2$ and 50 weight % $MoO_3$ (FIG. 3) shows a high discharge capacity when compared with the reference $CuF_2$ electrode material (FIG. 1). However, the specific capacity is not greatly varied from that of $CuF_2$ high-energy milled with carbon (FIG. 2). An electrode with 25 weight % $MoO_3$ and 75 weight % $CuF_2$ (FIG. 4) is observed to have a greater specific capacity than the electrode that combines $CuF_2$ and carbon (FIG. 2) when the materials are post annealed at 200° C. for several hours. The specific capacity is further improved when only 15 weight % $MoO_3$ is used (FIG. 5). The specific capacity is increased even more at 7 weight % $MoO_3$ (FIG. 6).

Figure 7:
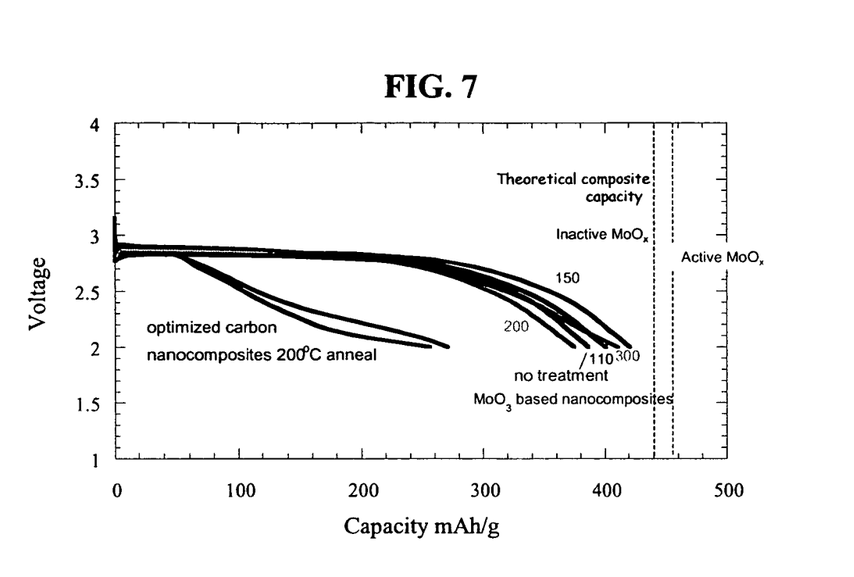
FIG. 7 is a graph depicting voltage as a function of specific capacity for a copper fluoride nanocomposite with varying amounts of $MoO_3$ and a copper fluoride nanocomposite with a carbon conductive matrix demonstrating the specific advantage of a metal oxide/oxyfluoride matrix.

As can be seen in FIG. 7, $CuF_2$ nanocomposites with $MoO_3$ conductive matrices routinely have specific capacities in excess of 400 mAh/g. These values exceed non-nanostructured $CuF_2$ (the reference electrode material) by a considerable amount as this macro material shows little electrochemical activity (FIG. 1). Accounting for the weight of the matrix in the $CuF_2$ nanocomposite, it is clear that the specific energy densities at greater than 90% of the theoretical energy densities are exceptional. Such calculations assume that $MoO_3$ is an electrochemically active matrix composition.

Example 6

Figure 8:
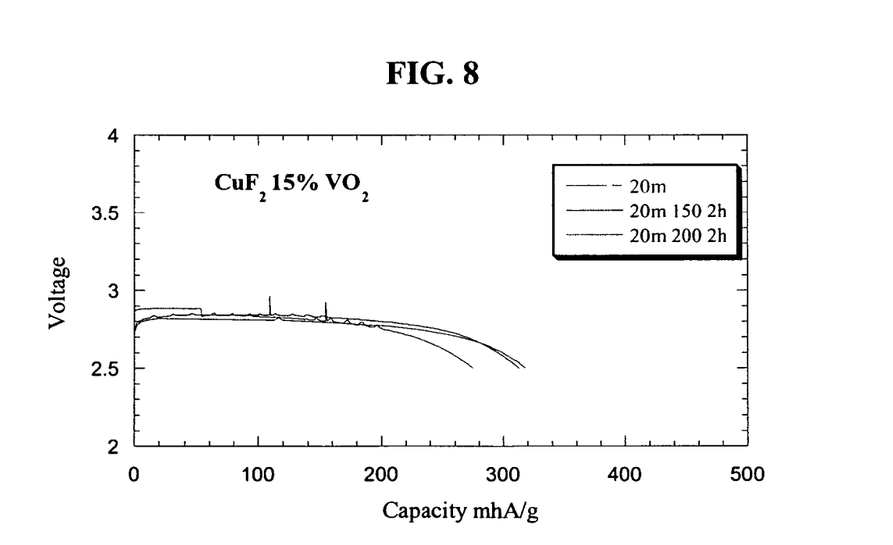
FIG. 8 is a graph depicting voltage as a function of specific capacity for a copper fluoride nanocomposite of the invention with 15 weight % $VO_2$ conductive matrix.

Effect of VO₂ Conductive Matrix on the Specific Capacity of CuF₂ Inventive Nanocomposite 15 weight % $VO_2$ was high-energy milled with 85 weight % $CuF_2$ and tested for specific capacity, as described above, to ascertain the effect of this conductive matrix. FIG. 8 shows the high discharge specific capacity of this nanocomposite in comparison with the $CuF_2$ reference electrode material (FIG. 8).

Example 7

Effect of Carbon on the Specific Capacity of the CuMoOF Inventive Nanocomposite As described and shown above, the specific capacities of the CuMoOF nanocomposites of the present invention, were improved by lowering the weight percentages of the $MoO_3$ matrix component. As the percentages of molybdenum and oxygen were decreased, carbon was added to the nanocomposite to improve the uniformity of the inventive nanocomposite. 7 weight % $MoO_3$ and 93 weight % $CuF_2$ were high-energy milled for 20 minutes, followed by another milling for either 10 minutes or 30 minutes with the addition of 5 weight % SP carbon, a type of networked carbon black supplied by MMM, Belgium. The samples were annealed at 200° C. for two hours at various periods indicated in Table 1. As is evident in Table 1, exemplary specific capacity was observed with the best results exceeding 96% utilization of $CuF_2$, even though carbon was used. Carbon offers electrical conductivity, but, for the most part, is electrochemically non-active.

TABLE 1

| 7 weight % MoO3 + 93 weight % CuF2 20 m HEM Anneal Temp (° C.) (2 h) | 5 weight % C HEM time | Post anneal (2 h) Temp (° C.) | Specific Capacity mAh/g Composite |
| --- | --- | --- | --- |
| 200 | 10 m | None | 414 |
| 200 | 10 m | 200 | 411 |
| 200 | 30 m | None | 396 |
| 200 | 30 m | 200 | 444 |
| None | 10 m | None | 397 |
| None | 10 m | 200 | 403 |
| None | 30 m | None | 401 |
| None | 30 m | 200 | 448 |

Example 8

Characterization of Novel Inventive CuF₂ Structure

Figure 9:
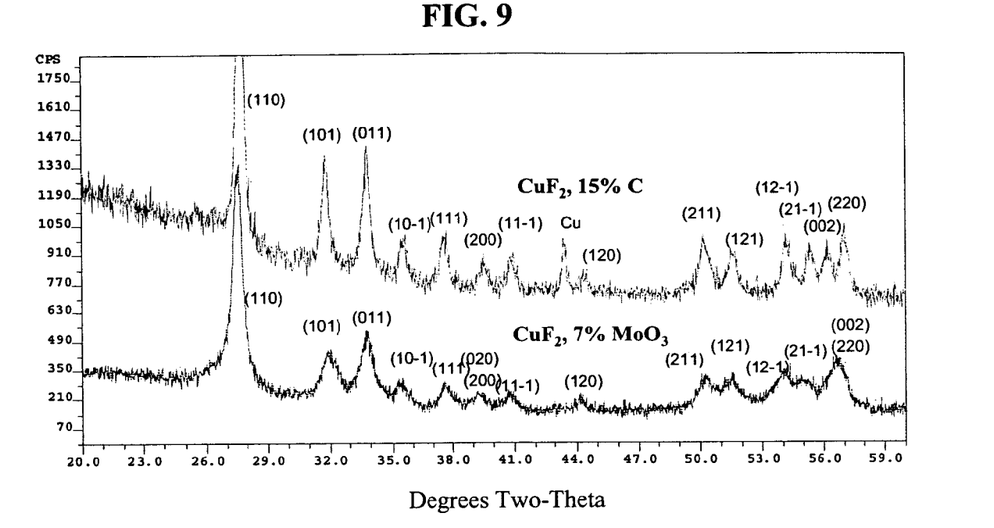
FIG. 9 shows X-ray diffraction data of a novel copper fluoride structure fabricated with $CuF_2$ and a $MoO_3$ conductive matrix and a copper fluoride nanocomposite fabricated with carbon.
Figure 10:
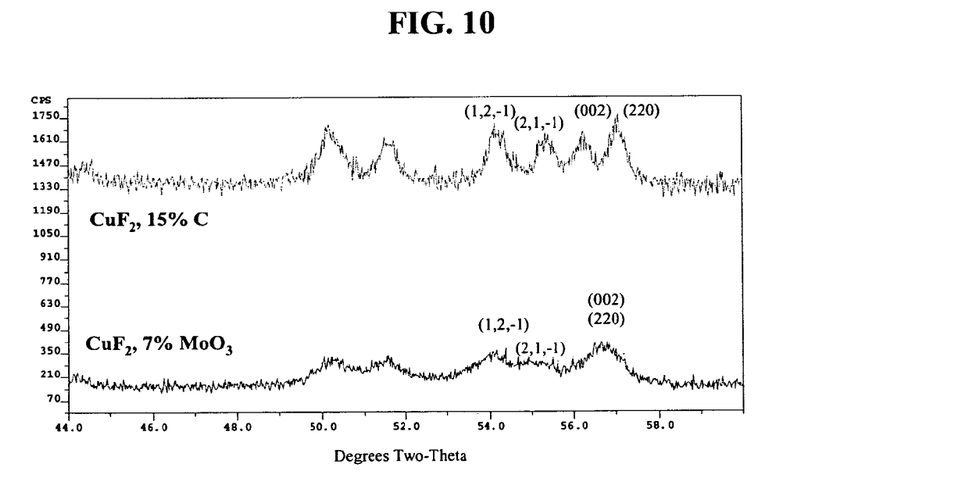
FIG. 10 depicts Bragg reflection peaks characterizing a novel copper fluoride structure.

When 7 weight % $MoO_3$ and 93 weight % $CuF_2$ are high-energy milled as described above, a new structural material is observed as shown in FIG. 9 and FIG. 10. These figures show the four known Bragg reflections associated with the monoclinic form of $CuF_2$ (1,2,−1), (2,1,−1), (002), when $CuF_2$ with 15 weight % carbon is used for the nanocomposite. However, $CuF_2$ with 7 weight % $MoO_3$ results in only three peaks. Particularly, the (002) and (220) peaks coalesce into a combined peak when (002) and (220) are almost of the same values (see FIG. 9 and FIG. 10). This result is indicative of a structural transformation of the monoclinic lattice from where "b" does not equal "c", to where "b" approximately equals "c". This structural transformation is consistent among all the optimized materials utilizing a matrix that contains an oxygen anion, as shown in the XRD scans of FIG. 11. Without being bound by theory, the metal oxide matrix releases some of its oxygen to the copper fluoride nanostructure while the metal oxide matrix incorporates fluorine anions from the copper fluoride in a thermodynamically driven anion exchange.

Figure 11:
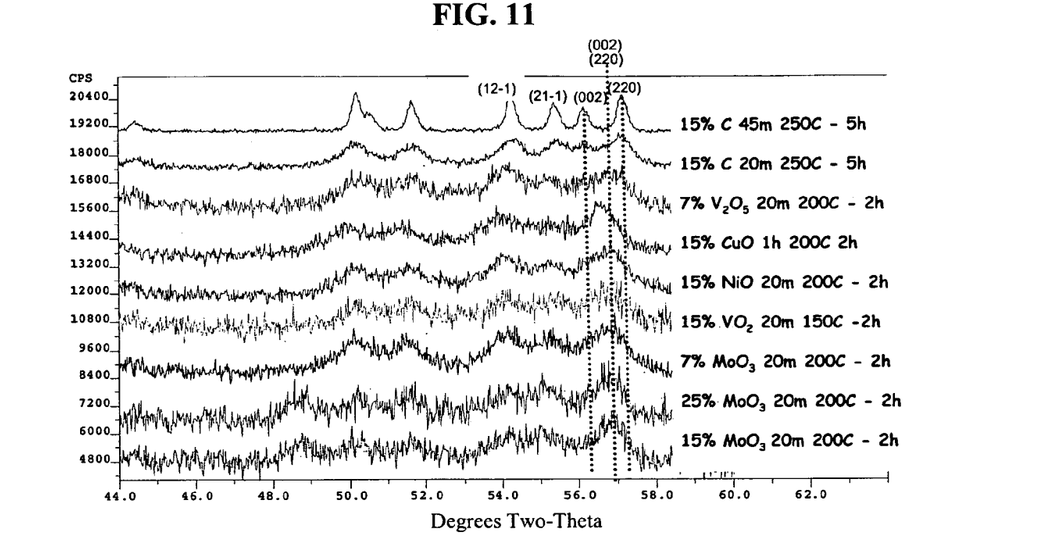
FIG. 11 depicts Bragg reflection peaks of copper fluoride with carbon nanocomposites, and nanocomposites of copper fluoride with metal oxygen-anion-containing conductive matrices.
Figure 12:
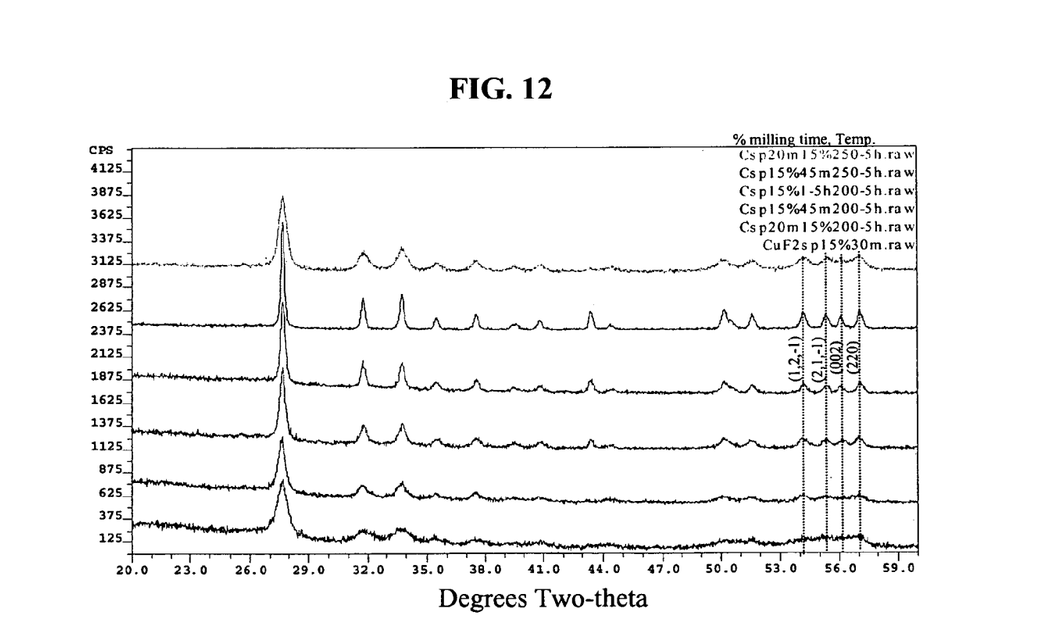
FIG. 12 depicts Bragg reflection peaks of copper fluoride and carbon nanocomposites under a wide variety of nanocomposite formation conditions and post fabrication thermal anneals.

The XRD scans of FIGS. 11 and 12 present examples where high-energy milling of $CuF_2$ with carbon results in the retention of the monoclinic structure, as previously described for FIG. 9 and FIG. 10. FIG. 12 shows that under a wide variety of nanocomposite formation conditions and post fabrication thermal anneals, there is a consistent formation of the four Bragg peaks (1,2,−1), (2,1,−1), (002), and (220), between the 2θ values of 52 and 59 degrees. As described above, none of these samples exhibit the outstanding electrochemical properties of the inventive $CuF_2$ nanocomposites.

Figure 13:
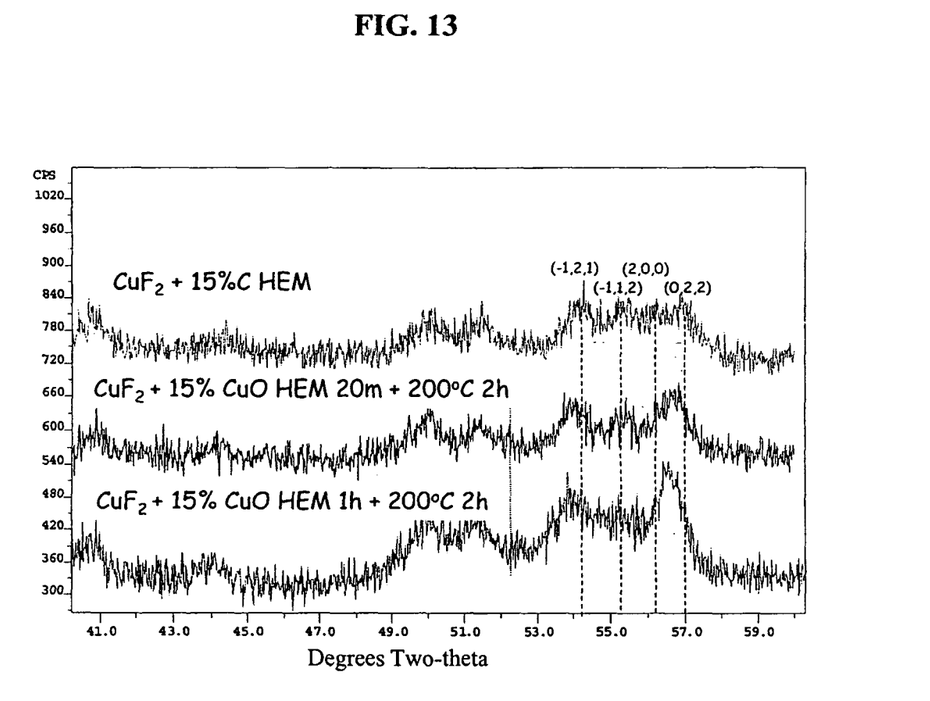
FIG. 13 depicts Bragg reflection peaks of copper fluoride and carbon nanocomposites, and copper fluoride and CuO nanocomposites.

To further support the fact that anion substitution is involved with the formation of the novel copper fluoride composition, $CuF_2$ nanocomposites were formed with isocation CuO materials. FIG. 13 compares this composition with carbon based $CuF_2$ nanocomposites. The identical structural transformation is seen to occur with this material as was shown with the other metal oxides, described above. The transformation is not due to other cations since Cu was utilized both in the fluoride and the oxide.

While the present invention has been described with respect to what is presently considered to be the preferred embodiment(s), it is to be understood that the invention is not limited to the disclosed embodiment(s). To the contrary, the invention is intended to cover various modifications and equivalent compositions and/or arrangements included within the sprit and scope of the appended claims. The scope of the following claims is to be accorded the broadest interpretation so as to encompass all such modifications and equivalent structures and functions.

We claim:

1. A positive electrode composition comprising a copper fluoride compound nanocomposite demonstrating a specific capacity of about 100 mAh/g to about 600 mAh/g at a voltage of about 2 volts to about 4 volts when compared to a Li/Li+ reference potential, wherein the copper fluoride compound nanocomposite comprises a copper fluoride compound component having a monoclinic crystal structure and a mixed conducting inorganic matrix compound component;
   the mixed conducting inorganic matrix compound component of the copper fluoride compound nanocomposite being characterized by:
   (i) the copper fluoride compound is of formula $Cu_xMe_yF_z$, wherein Me is a metal, wherein x>y, and z>0, and wherein Me is selected from the group consisting of Fe, Co, Ni, Mn, V, Mo, Pb, Bi, Sn, Nb, Cr, and Zn,
   (ii) the mixed conducting inorganic matrix compound component is selected from the group consisting essentially of $VO_2$, $MoO_2$, $MoO_3$, $V_2O_5$, $V_6O_{13}$, NiO, CuO, carbon fluorides, molybdenum sulfides, molybdenum oxysulfides, titanium sulfide, chromium oxide, manganese oxide ($MnO_2$) and $MoO_xF_z$, wherein x is $0 \leq x \leq 3$ and z is $0 \leq z \leq 5$, and wherein Mo, O and F are combined in such a way that an effective charge on the Mo cation is not more than 6+ and capable of conducting both ions and electrons;
   (iii) the copper fluoride compound nanocomposite and the mixed conducting inorganic matrix compound component each have a crystallite size of about 1 nm to about 100 nm in diameter;
   (iv) the mixed conducting inorganic matrix compound component imparts electronic and ionic conductivity greater than $1 \times 10^{-7}$ S/cm; and
   (v) the mixed conducting inorganic matrix compound component is less than 30% molar.

2. The positive electrode composition of claim 1, the copper
   fluoride compound nanocomposite being characterized by:
       a specific capacity of about 300 mAh/g to about 500 mAh/g.

3. The positive electrode composition of claim 1, wherein the copper fluoride compound nanocomposite comprises $CuF_2$.

4. The positive electrode composition of claim 1, further comprising carbon.

5. The positive electrode composition of claim 4, wherein the carbon is present in an amount that is less than 50 weight % of the composition.

6. The positive electrode composition of claim 1, further comprising oxygen.

7. The positive electrode composition of claim 1, wherein the nanocomposite comprises $Cu_xMe_yF_zO_w$, where x+z>y+w, y=0, and w>0.

8. The positive electrode composition of claim 1, wherein the nanocomposite comprises $Cu_xMe_yF_zO_w$, and x+z>y+w and w>0.

9. The positive electrode composition of claim 8, wherein the Me is a transition metal.

10. The positive electrode composition of claim 7, wherein the Me is a transition metal.

11. The positive electrode composition of claim 1, wherein the mixed conducting inorganic matrix compound component is $MoO_xF_z$.

12. The positive electrode composition of claim 1, wherein the specific capacity is rechargeable by passing a current through the nanocomposite in a direction opposite a discharge direction.

13. The positive electrode composition of claim 1, wherein the copper fluoride compound nanocomposite comprises from about 1 to about 50 weight percent of the conductive matrix.

14. The positive electrode composition of claim 8, wherein the nanocomposite further comprises carbon, wherein the carbon is present in an amount that is less than 50 weight % of the composition.

* * * * *

UNITED STATES PATENT AND TRADEMARK OFFICE
CERTIFICATE OF CORRECTION

| | | |
|---|---|---|
| PATENT NO. | : 9,065,137 B2 | Page 1 of 1 |
| APPLICATION NO. | : 11/177729 | |
| DATED | : June 23, 2015 | |
| INVENTOR(S) | : Glenn G. Amatucci et al. | |

It is certified that error appears in the above-identified patent and that said Letters Patent is hereby corrected as shown below:

In the Specification

Column 1, line 21, insert:

--GOVERNMENT RIGHTS
This invention was made with federal government support. Consequently, the government has certain rights in the invention.--

Signed and Sealed this
Thirty-first Day of May, 2016

Michelle K. Lee
*Director of the United States Patent and Trademark Office*